United States Patent [19]

Schedin et al.

[11] Patent Number: 5,711,972
[45] Date of Patent: Jan. 27, 1998

[54] DEVICE FOR BOARD MANUFACTURE

[75] Inventors: Kurt Schedin, Sundsvall; Vincent Pihlström, Bergeforsen; Fredrik Nilsson, Ankarsvik, all of Sweden

[73] Assignee: Sunds Defibrator Industries AB, Sweden

[21] Appl. No.: 722,257

[22] PCT Filed: Apr. 3, 1995

[86] PCT No.: PCT/SE95/00353

§ 371 Date: Oct. 8, 1996

§ 102(e) Date: Oct. 8, 1996

[87] PCT Pub. No.: WO95/31318

PCT Pub. Date: Nov. 23, 1995

[30] Foreign Application Priority Data

May 13, 1994 [SE] Sweden ................ 9401648

[51] Int. Cl.⁶ ................ B29C 43/24; B29C 43/46
[52] U.S. Cl. ................ 425/363; 425/373; 425/394; 425/404; 264/83
[58] Field of Search ................ 425/363, 364 R, 425/373, 404, 80.1, 83.1, 115, 130, 131, 395; 264/82, 83

[56] References Cited

U.S. PATENT DOCUMENTS

| | | | |
|---|---|---|---|
| 3,734,669 | 5/1973 | Ettel | 425/373 |
| 4,420,299 | 12/1983 | De Mets | 425/371 |
| 4,923,656 | 5/1990 | Held | 264/83 |
| 4,937,024 | 6/1990 | Hickson | 264/83 |
| 5,433,905 | 7/1995 | Tisch | 425/371 |
| 5,658,407 | 8/1997 | Thorbjörnsson | 425/371 |

OTHER PUBLICATIONS

Dialog Information Services, File 240, Paperchem, Dialog accession no. 461009, Paperchem No. 60–01009, Darchi-ashvili V.V. et al: "Apparatus for Impregnating Wood fiber Mats," USSR Pat. 1,426,794, issued Sep. 30, 1988; filed: USSR appln. 4,273,778/29–15 (Apr. 13, 1987).

*Primary Examiner*—Khanh P. Nguyen
*Attorney, Agent, or Firm*—Lerner, David, Littenberg, Krumholz & Mentlik

[57] ABSTRACT

Apparatus for compressing mats of lignocellulose-containing material into board material is disclosed including a rotary compression roll having a perforated shell on its surface with axial ducts disposed within the rotary compression roll adjacent to that surface and a shoe adjacent to one end of the rotary compression roll in which the shoe includes a channel for injecting a processing medium into at least one of the axial ducts so that the processing medium is directed onto the mat in a processing section during compression of the mat by the rotary compression roll.

10 Claims, 2 Drawing Sheets

DEVICE FOR BOARD MANUFACTURE

FIELD OF THE INVENTION

The present invention relates to a dry method for the continuous manufacture of board. More particularly, the present invention relates to such a method using as starting material lignocellulosic material such as wood, straw, bagasse and the like. Still more particularly, the present invention relates to a device for compressing and processing a mat of lignocellulosic material during the manufacture of board material.

BACKGROUND OF THE INVENTION

The manufacture of board material using the dry method comprises the steps of disintegrating the raw material to particles and/or fibers of a suitable size, drying them to a definite moisture content, glueing the material prior or subsequent to the drying step, forming the glued material into a mat, and compressing and hot pressing the mat into the form of a complete board.

The continuous compressing and pressing of the mat of lignocellulose-containing material into a board can be affected positively by injecting a suitable processing medium, in the form of a gas or liquid, whereby the properties of the complete board can also be improved. An example of such a processing medium is a vapor, which heats and moistens the fibers in the material and thereby facilitates the pressing operation and/or accelerates the hardening process. Other possibilities are the injection of a hardening agent or an accelerating agent into the already pre-glued mat.

In order to facilitate the injection of a vapor or another gas into the material mats, an injection box is normally used, against which the mat or a wire support for the mat slides. The box is provided with a large number of injection holes or slots and an edge which seals to the mat/wire. The box can be formed, for example, as a tubular package, or in some other way. All of the various configurations of the box have one feature in common—i.e., they must be constructed so as to permit the mat/wire to slide against the box.

In certain cases an injection box is located on one side of the mat, and a suction box on the opposite side, directly in front or offset therefrom. The injection and suction boxers are usually given a similar shape.

The sliding which takes place between the mat/wire and the injection and suction boxes, respectively, gives rise to considerable wear, which implies that at least the sliding surfaces must be exchanged. Furthermore, the sliding between the mat/wire and the boxes often causes problems with the edge sealing.

SUMMARY OF THE INVENTION

These and other objects have now been realized by the invention of an apparatus for compressing a mat of lignocellulose-containing material during the manufacture of board material therefrom which comprises at least one rotary compression roll including a circumferential surface and first and second end walls, the at least one rotary compression role including a perforated shell forming that circumferential surface, a plurality of axially oriented ducts disposed within the rotary compression roll adjacent to the surface, and a shoe disposed adjacent to the first end wall of the rotary compression roll, the shoe including a channel for injection a processing medium into at least one of the plurality of axially oriented ducts whereby the processing medium is directed onto the mat in a processing section during compression of the mat by the rotary compression roll. In a preferred embodiment, the shoe is slidable along the first end wall whereby the location of the processing section can be altered.

In accordance with one embodiment of the apparatus of the present invention, the shoe has a length corresponding to a minor portion of the circumference of the rotary compression roll.

In accordance with another embodiment of the apparatus of the present invention, the apparatus includes a plurality of support strips carrying the perforated shell and defining the plurality of axially oriented ducts.

In accordance with another embodiment of the apparatus of the present invention, the channel comprises a first channel, and the shoe includes at least one additional channel. In a preferred embodiment, the at least one additional channel comprises a plurality of additional channels, whereby the plurality of additional channels can be used for injecting a processing medium or for applying a blowing or suction force to the plurality of axially oriented ducts.

In accordance with another embodiment of the apparatus of the present invention, the apparatus includes heating means for heating the plurality of axially oriented ducts. In a preferred embodiment, the heating means comprises a metal sheet disposed within the rotary compressing roll radially inwardly with respect to the plurality of axially oriented ducts, and a plurality of grooves disposed in the metal sheet whereby a heating medium can be disposed within the plurality of grooves.

In accordance with another embodiment of the apparatus of the present invention, the apparatus includes a pair of shoes disposed adjacent to both the first and second end walls of the rotary compression roll.

In accordance with yet another embodiment of the apparatus of the present invention, the apparatus includes an exchangeable wear member abutting the first end wall of the rotary compression roll and disposed between the first end roll and the shoe.

In accordance with the present invention, all of these objects have been accomplished by the addition of a processing medium to a compression roll in a manner whereby sliding contact is avoided.

BRIEF DESCRIPTION OF THE DRAWINGS

The present invention may be more fully appreciated with reference to the following detailed description, which, in turn, refers to the accompanying drawings in which.

DETAILED DESCRIPTION

Figure 1:
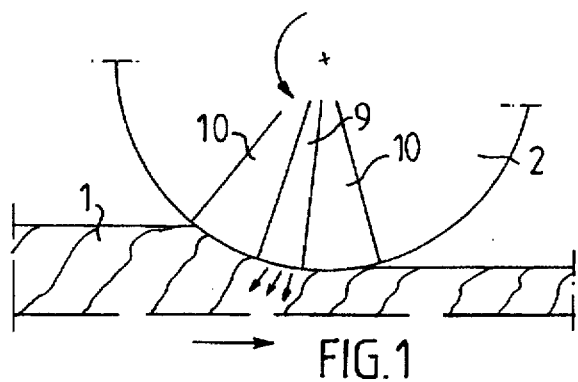
FIG. 1 is a side, elevational partial schematic representation of the operation of the present invention.
Figure 2:
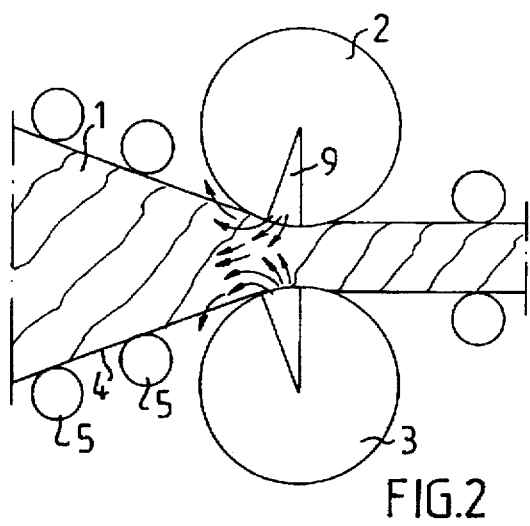
FIG. 2 is a side schematic representation of one method for applying the present invention.
Figure 3:
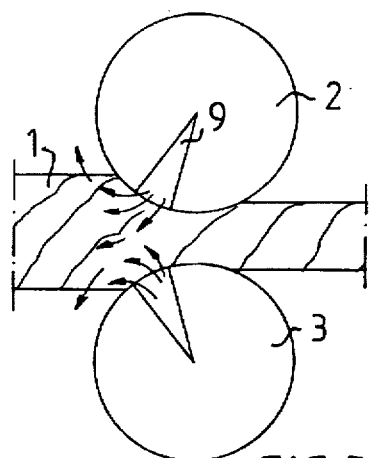
FIG. 3 is a side schematic representation of another method of applying the present invention.
Figure 4:
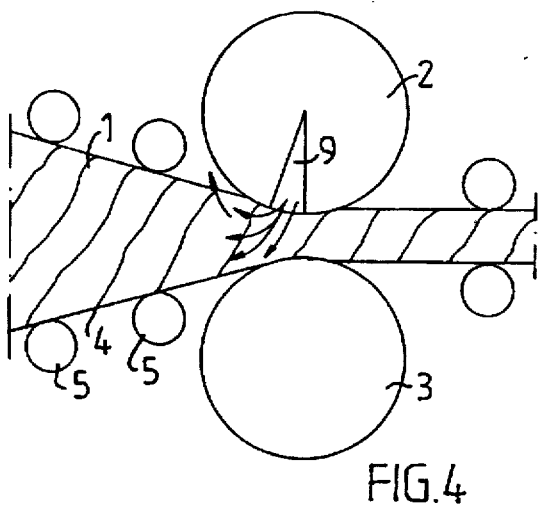
FIG. 4 is a side schematic representation of another method of applying the present invention.
Figure 5:
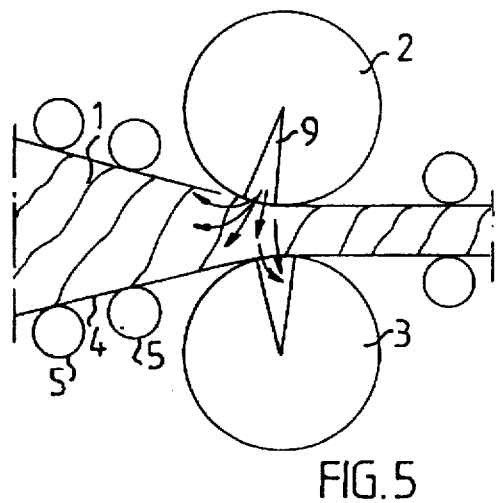
FIG. 5 is a side schematic representation of yet another method of applying the present invention.

Referring to the drawings, in which like reference numerals refer to like elements thereof, during the compression and processing of a material mat 1 during the manufacture of a board, the compression is carried out with a compression roll 2 (FIG. 1). This roll can preferably operate in tandem with a counter-roll 3, whereby the compression takes place symmetrically from both sides of the mat 1 (FIGS. 2–5). The processing medium can be injected through the rolls, 2 and 3, symmetrically from both sides (FIGS. 2–3). This implies uniform processing of the mat as well as optimum air removal from the mat to the inlet. Alternatively, a first roll 2 can be formed for injection of the processing medium, while the counter-roll 3 consists only of a supporting roll (FIG. 4) or a suction roll (FIG. 5). According to FIGS. 2, 4 and 5, wires 4 with rolls 5 are used as support for the mat 1, while FIG. 3 shows an embodiment without a wire.

Figure 6:
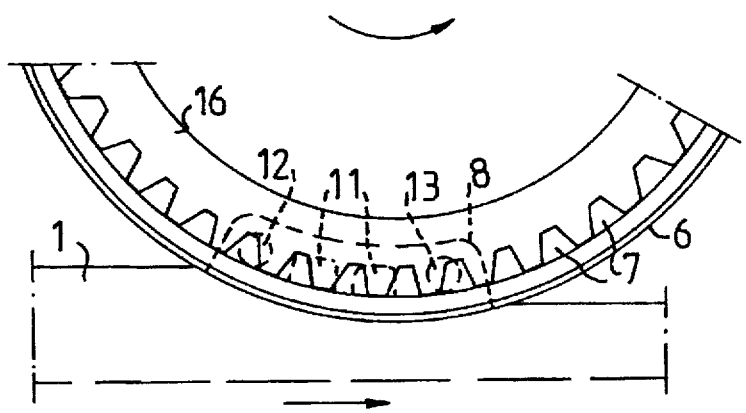
FIG. 6 is a partial side representation of a detail of an end wall for a compression roll in accordance with the present invention.
Figure 7:
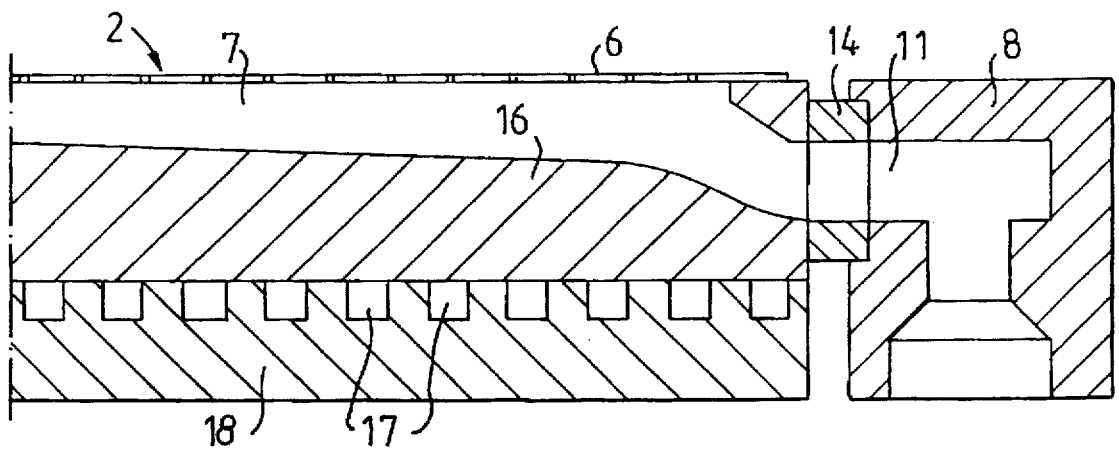
FIG. 7 is a front cross-sectional view of a portion of the apparatus of the present invention.

The compression and injection roll 2 shown in FIG. 6 has a perforated shell surface 6 for the supply of processing medium to the mat 1. About the circumference of the roll 2 inside of the shell surface 6 an axial duct system 7 is arranged for distribution of the processing medium across the width of the roll 2, and thereby of the mat 1. An adjustable slide shoe 8 (FIG. 7) sealingly abuts the end wall of the roll 2 for the supply of processing medium to the duct system 7. The supply takes place to a restricted sector 9 of the roll 2 where the mat 1 is compressed. This restricted sector 9 is enclosed on both sides, as viewed in the circumferential direction, by sealing zones 10 where the roll 2 is in contact with the mat 1. The duct system 7 can be closed at the opposite end wall of the roll 2. Alternatively, a slide shoe 8 can be provided at each of the end walls.

The slide shoe 8 is held in place by means of an adjustable stand, so that the slide shoe can be moved in the circumferential direction. It is thereby possible to vary the position of the injection sector 9. The slide shoe 8 is preferably formed with an exchangeable wear portion 14 of a low-friction material, which abuts a working surface on the end wall of roll 2. The slide shoe 8 is held pressed against the end wall of the roll, for example by means of springs, compressed air or hydraulically, so that leakage in the sealing surface is minimized.

The slide shoe can be formed with one or more channels 11, 12, 13, which can have different areas. Exchangeable wear portions 14 with different internal areas can also be used, for example a slide plate with variable internal openings. It is therefore possible to vary the size of the injection sector 9. In different parts of the injection sector 9 different flows and pressures can be maintained. The channels of the slide shoe 8 can also be used for blow cleaning and suction.

In FIG. 6 the contact surface of the slide shoe 8 against the end wall of the roll 2 is shown schematically. The slide shoe 8 is provided with injection channels 11 for processing medium, blow cleaning channel 12 and suction channel 12 and suction channel 13. The processing medium can be, for example, low-pressure steam in the first injection channel 11, seen in the feed direction, and high-pressure steam in the second injection channel 11.

The perforated shell surface 6 on the roll 2 can consist of a punched or drilled hollow metal sheet, which is firmly shrunk on the roll in the form of rings. Axial support strips 15 for the hollow metal sheet can be formed in a shell metal sheet 16 on the roll by milling or casting, or they can consist of separate strips attached in recesses in the shell metal sheet 16. These strips 15 can simultaneously define the duct system 7 inside of the shell surface 6.

The transverse distribution of the processing medium to the mat can be varied as desired in that the form of the ducts in the duct system 7 is varied axially, such as by reducing the area in the transverse direction.

The openings in the duct system 7, which in the end wall of the roll 2 are not covered by the slide shoe 8, can be sealed by means of an adjustable slide ring of a low-friction material which is held pressed against the end wall.

In order to prevent condensation in the duct system 7, the roll 2 can be heated. This can preferably be brought about by grooves 17 extending all about, and preferably arranged helically in the roll 2 inside of the duct system 7. These grooves can be arranged in a heat groove metal sheet 18 inside of the shell metal sheet 16. In these grooves 17, steam, oil or hot water is circulated so that uniform heat is supplied to the shell metal sheet 16.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. Apparatus for compressing a mat of lignocellulose-containing material during the manufacture of board material therefrom comprising at least one rotary compression roll including a circumferential surface and first and second end walls, said at least one rotary compression roll including a perforated shell forming said circumferential surface, a plurality of axially oriented ducts disposed within said rotary compression roll adjacent to said surface, and a shoe disposed adjacent to said first end wall of said rotary compression roll, said shoe including a channel for injecting a processing medium into at least one of said plurality of axially oriented ducts whereby said processing medium is directed onto said mat in a processing section during compression of said mat by said rotary compression roll.

2. The apparatus of claim 1 wherein said shoe is slidable along said first end wall whereby the location of said processing section can be altered.

3. The apparatus of claim 1 wherein said shoe has a length corresponding to a minor portion of said circumference of said rotary compression roll.

4. The apparatus of claim 1 including a plurality of support strips carrying said perforated shell and defining said plurality of axially oriented ducts.

5. The apparatus of claim 1 wherein said channel comprises a first channel, and wherein said shoe includes at least one additional channel.

6. The apparatus of claim 5 wherein said at least one additional channel comprises a plurality of additional channels, whereby said plurality of additional channels can be used for injecting a processing medium or for applying a blowing or suction force to said plurality of axially oriented ducts.

7. The apparatus of claim 1 including heating means for heating said plurality of axially oriented ducts.

8. The apparatus of claim 7 wherein said heating means comprises a metal sheet disposed within said rotary compression roll radially inwardly with respect to said plurality of axially oriented ducts, and a plurality of grooves disposed in said metal sheet whereby a heating medium can be disposed within said plurality of grooves.

9. The apparatus of claim 1 including a pair of said shoes disposed adjacent to both said first and second end walls of said rotary compression roll.

10. The apparatus of claim 1 including an exchangeable wear member abutting said first end wall of said rotary compression roll and disposed between said first end wall and said shoe.

* * * * *